(12) United States Patent
Plum

(10) Patent No.: US 12,246,609 B2
(45) Date of Patent: Mar. 11, 2025

(54) CHARGING DEVICE AND METHOD FOR OPERATING THE CHARGING DEVICE

(71) Applicant: Robert Bosch GmbH, Stuttgart (DE)

(72) Inventor: Thomas Plum, Cologne (DE)

(73) Assignee: Robert Bosch GmbH, Stuttgart (DE)

( * ) Notice: Subject to any disclaimer, the term of this patent is extended or adjusted under 35 U.S.C. 154(b) by 577 days.

(21) Appl. No.: 17/767,701

(22) PCT Filed: Sep. 15, 2020

(86) PCT No.: PCT/EP2020/075752
§ 371 (c)(1),
(2) Date: Apr. 8, 2022

(87) PCT Pub. No.: WO2021/069183
PCT Pub. Date: Apr. 15, 2021

(65) Prior Publication Data
US 2023/0322105 A1    Oct. 12, 2023

(30) Foreign Application Priority Data
Oct. 11, 2019   (DE) ...................... 10 2019 215 645.2

(51) Int. Cl.
*B60L 53/24* (2019.01)
*B60L 53/22* (2019.01)
*H02M 3/335* (2006.01)

(52) U.S. Cl.
CPC ............... *B60L 53/24* (2019.02); *B60L 53/22* (2019.02); *H02M 3/335* (2013.01); *B60L 2210/30* (2013.01); *B60L 2210/40* (2013.01)

(58) Field of Classification Search
CPC ...... B60L 53/24; B60L 53/22; B60L 2210/30; B60L 2210/40; H02M 3/335; H02M 7/219; H02J 2207/20; H02J 7/02; Y02T 10/70; Y02T 10/7072; Y02T 10/92; Y02T 90/14
USPC ........................................................ 320/109
See application file for complete search history.

(56) References Cited

U.S. PATENT DOCUMENTS

| | | | |
|---|---|---|---|
| 5,940,280 A | 8/1999 | Murai et al. | |
| 2016/0065079 A1 | 3/2016 | Bai et al. | |
| 2019/0148973 A1* | 5/2019 | Kim | B60L 53/22 320/109 |

FOREIGN PATENT DOCUMENTS

EP    1248356 A2    10/2002

OTHER PUBLICATIONS

Translation of International Search Report for Application No. PCT/EP2020/075752 dated Dec. 9, 2020 (2 pages).

* cited by examiner

*Primary Examiner* — Paul Dinh
(74) *Attorney, Agent, or Firm* — Michael Best & Friedrich LLP

(57) ABSTRACT

The invention relates to a charging device (100), comprising: an input-side first terminal (110_1, 110_2) for connecting to an electrical energy source (200); an output-side second terminal (190_1, 190_2) for connecting to a battery (300) to be charged; and a transformer (150), the primary winding (150_1) of which is electrically connected to the first terminal (110_1, 110_2) by means of a primary circuit (400) and the secondary winding (150_2) of which is electrically connected to the second terminal (190_1, 190_2) by means of a secondary circuit (500).

9 Claims, 4 Drawing Sheets

CHARGING DEVICE AND METHOD FOR OPERATING THE CHARGING DEVICE

BACKGROUND OF THE INVENTION

The invention relates to a charging device and to a method for operating the charging device. The invention further relates to a drive train having a charging device, to a vehicle having a drive train and also to a computer program and to a machine-readable storage medium.

Charging devices, for example in vehicles having an electrical drive in an electric vehicle or in a hybrid vehicle, serve for recharging batteries, preferably rechargeable batteries or traction batteries, from an electrical energy source, preferably AC sources or the public AC grid. For this purpose, the charging device converts sinusoidal alternating current from the energy source into a direct current. In the case of a single-phase alternating current, the power pulsates at twice the frequency of the alternating current.

Charging devices preferably have two-stage power electronics. A first stage shapes the sinusoidal input current from the AC grid, the so-called Power Factor Correction (PFC) stage. A second stage consists of a DC-to-DC converter which ensures galvanic isolation using a transformer and adjusts the voltage levels, preferably by means of an electrical circuit and a controller which sets the output voltage or the output current. A DC-link capacitor is arranged between the two stages and buffers the power pulsation at twice the frequency of the alternating current from the energy source. This DC link is typically realized using an electrolytic capacitor. These topologies enable a virtually sinusoidal input current to be maintained on the grid side in order to meet grid-side standards, enable galvanic isolation between the grid and the vehicle in order to meet safety requirements, and enable a constant output DC current to be provided on the side of the battery in order to minimize the load on the battery when charging.

Based on this two-stage circuit topology and the properties thereof, there is the need for simplified circuit topologies for compact and lighter charging devices, preferably for electric vehicles.

SUMMARY OF THE INVENTION

Provided is a charging device having an input-side first terminal for connection to an electrical energy source, an output-side second terminal for connection to a battery to be charged, and a transformer, the primary winding of which is electrically connected to the first terminal by means of a primary circuit and the secondary winding of which is electrically connected to the second terminal by means of a secondary circuit.

The primary circuit comprises a rectification circuit and a parallel connection of two branches each having a high-side element and a low-side element. A first branch comprises a first and a second series-connected capacitor and a first center tap between the capacitors, which first center tap is connected to a first connection pole of the primary winding. A second branch comprises a series-connected first low-side switching element and a second series-connected high-side switching element having a second center tap between the switching elements, which second center tap is connected to a second connection pole of the primary winding, wherein the intrinsic diodes of the first and of the second switching element are aligned such that a flow from the low side to the high side of the second branch is made possible.

The secondary circuit comprises a parallel connection of two branches, the third branch and the fourth branch, each having a high-side element and a low-side element.

The third branch comprises a series connection of a first high-side diode and of a third low-side switching element having a third center tap between the first diode and the third switching element, which third center tap is connected to a second connection pole of the secondary winding, wherein the first diode and the intrinsic diode of the third switching element are aligned such that a flow from the low side to the high side of the third branch is made possible. The fourth branch comprises a series connection of a second high-side diode and of a fourth low-side switching element having a fourth center tap between the second diode and the fourth switching element, which fourth center tap is connected to a first connection pole of the secondary winding, wherein the second diode and the intrinsic diode of the fourth switching element are aligned such that a flow from the low side to the high side of the fourth branch is made possible. A first connection pole of the second terminal is connected to the cathodes of the first and second diode and a second connection pole of the second terminal is connected to the third and fourth switching elements at the ends of the third and fourth branch.

An electrical energy source is preferably a single-phase AC grid, preferably of the public low-voltage grid. A battery to be charged is preferably a rechargeable battery or a traction battery, the energy of which is used to operate an electrical drive train of a vehicle. A rectification circuit is preferably a rectifier for converting the alternating current into a direct current. A branch of a parallel connection having a high-side element and a low-side element is preferably a half-bridge having two electrical, passive and/or active components and a center tap between the components. The center tap of the half-bridge is supplied with electrical energy via the components, wherein a first component on a first side of the center tap is designated a high-side component and a second component on the other side of the center tap is designated a low-side component. Switching elements are preferably power semiconductor switches which comprise an intrinsic diode, preferably IGBTs or MOSFETs. The expression "connecting, for example, a center tap to a connection pole" preferably means joining, contacting or connecting the components by means of an electrically conductive line or a galvanic connection.

A simplified circuit arrangement of a charging device is advantageously provided, which enables a virtually sinusoidal input current on the grid side, galvanic isolation between the grid and the vehicle and a constant output DC current. This is realized with a minimal number of components, which makes cost-effective manufacturing of a charging device based on this topology possible. Only 4 switching elements, preferably active semiconductor switches, are used, which are preferably operated in zero-voltage switching (ZVS) and/or zero-current switching (ZCS). This results in low switching losses, which makes a high switching frequency possible. This allows small passive components to be used. Actuation complexity (driver, logic, processor) is preferably considerably reduced on account of the low number of switching components. Preferably only one inductive component is used: The topology preferably uses only one coupled inductor both as a transformer and as a PFC inductor. The transformer is preferably used as a component for galvanic isolation and as a PFC inductor for the charging device. This leads to a reduced volume of the charging device.

In another embodiment of the invention, the rectification circuit comprises a series-connected third high-side diode and a fourth low-side diode having a fifth center tap between the diodes, which fifth center tap is connected to a first connection pole of the first terminal, wherein the series-connected third high-side diode and fourth low-side diode are connected in parallel with the first and second capacitor and wherein the third and the fourth diode are aligned such that a flow from the low side to the high side is made possible and wherein the first center tap between the capacitors is connected to a second connection pole of the first terminal.

The simple series connection of the diodes only allows current to flow from the energy source into the primary circuit in the desired direction.

Advantageously provided is a simple rectification circuit for a simplified circuit arrangement of a charging device, which enables a virtually sinusoidal input current on the grid side, galvanic isolation between the grid and the vehicle and a constant output DC current.

In another embodiment of the invention, the rectification circuit comprises a bridge rectifier having four diodes, which bridge rectifier is connected, on its input side, to a first connection pole and to a second connection pole of the first terminal, and, on its output side, is connected in parallel with the second capacitor.

The bridge rectifier enables current to flow from an energy source into the primary circuit regardless of its direction. On account of the full-wave rectification, the half-oscillations of the (AC) energy source have the same polarity in the DC circuit of the primary circuit.

Advantageously provided is an alternative rectification circuit for a simplified circuit arrangement of a charging device, which enables a virtually sinusoidal input current on the grid side, galvanic isolation between the grid and the vehicle and a constant output DC current.

In another embodiment of the invention, a further, fifth branch is connected in parallel with the primary circuit, which branch comprises a third capacitor. This third capacitor is preferably an electrolytic capacitor which buffers the pulsating power (twice the grid frequency) in the primary circuit. An optimized primary circuit for a simplified charging device is advantageously provided.

In another embodiment of the invention, a fourth capacitor is connected between the fourth center tap and the first connection pole of the secondary winding. This fourth capacitor is preferably a film capacitor or ceramic capacitor configured to compensate for grid-frequency voltage components.

An optimized secondary circuit for a simplified charging device is advantageously provided.

The invention further relates to a drive train of a vehicle having an inverter and an electrical machine, wherein the drive train comprises at least one charging device as described above. A drive train of an electric vehicle having a charging device with a simplified circuit topology is advantageously provided.

The invention further relates to a vehicle having a drive train as described above.

A vehicle having a charging device with a simplified circuit topology is advantageously provided.

The invention further relates to a method for operating a charging device as presented above, having the steps: alternately switching the second and the first switching element on and off, wherein, when the first switching element is switched on, the fourth switching element is switched on and switched off at least once, wherein, when the second switching element is switched on, the third switching element is switched on and switched off at least once.

By alternately switching the second and the first switching element on and off, the primary winding or main inductor and the third capacitor or the electrolytic capacitor are alternately charged when the voltage from the energy source is positive. When the grid voltage is negative, the components swap their roles such that the primary winding and the third capacitor are charged as well. There is step-up converter operation. The predefinable switching frequency of the first and second switching element is in this case significantly greater than the AC frequency of the energy source such that, during a phase of a positive grid voltage or of a negative grid voltage, the first and the second switching element S1, S2 are switched on and off multiple times. In order to avoid a short circuit, the first and the second switching element S1 and S2 are never switched on at the same time and a dead time is preferably maintained after a switching element is switched off and before another switching element is switched on. The input current is controlled by varying the duty cycle of the first and/or second switching element. By switching the fourth switching element on and off at least once while the first switching element is switched on, the secondary coil absorbs energy. By switching the third switching element on and off at least once while the second switching element is switched on, the energy from the secondary coil is supplied to the output terminals. There is likewise step-up converter operation. The output current and/or the output voltage is/are controlled by varying the duty cycle of the third and/or fourth switching element.

The main inductor of the transformer serves as a PFC inductor. A distinction is made between four switching states. The first and the second switching element S1 and S2 are always switched alternately with a defined duty cycle. Dead times are provided between the switching off of the first and second switching element S1 and S2 and the switching on of the second and first switching element S2 and S1 in order to enable passive commutation of the current or to safely prevent a bridge short circuit. So long as the grid voltage is positive, the third high-side diode is permanently conductive in this phase, that is to say is operated only with grid frequency. The grid voltage is thus also present at the first capacitor or upper capacitor of the capacitor half-bridge. The second switching element S2 is initially switched on. The grid voltage is applied over the main inductor of the transformer, resulting in an increasing current through the transformer. The second switching element S2 is subsequently switched off. The current commutates passively to the reverse-conducting intrinsic diode of the first switching element S1, such that this switching element can be switched on with ZVS after a dead time. The main inductor then preferably drives the current into the third capacitor or electrolytic capacitor. This is step-up converter operation. Energy is stored in the third capacitor in this case. After a certain time, the first switching element S1 is switched off and the second switching element S2 is switched on again. The described cycle thus begins anew. The operation for negative grid voltages functions in a very similar way. In this case, all components swap their roles. The fourth low-side diode is now conductive. When the first switching element S1 is switched on, a current through the transformer is built up again (in the same direction as previously). After the first switching element S1 is switched off, the second switching element S2 is switched on with ZVS and energy is supplied to the third capacitor in this case. This is also step-up converter operation. By switching off the second switching element S2 and switching on the first switching element S1, the cycle begins anew.

When the first switching element S1 is switched on, the fourth switching element S4 is switched on for voltage conversion. An increasing current builds up across the leakage inductance of the transformer. The fourth capacitor or the series capacitance on the secondary side of the converter preferably serves as a DC block and is dimensioned such that there is no significant change in voltage over a switching period. After switching off the fourth switching element, the current commutates independently to the second high-side diode in this branch and thus supplies current to the connected battery. As soon as the first switching element S1 is switched off and the second switching element S2 is switched on after the dead time, the current commutates at a steep rate from the secondary side back to the primary side. The third switching element S3 is now switched on. The secondary-side current changes its sign and now flows back through the third switching element S3 and the fourth switching element S4. After a certain period of time, the third switching element S3 is switched off and the current commutates to the corresponding first high-side diode and supplies current to the battery. By switching on the first switching element S1 and the fourth switching element S4, the cycle begins anew.

The converter is preferably operated in continuous operation, i.e. the current in the secondary-side leakage inductance of the transformer has no phases in which this current is zero. All switching elements are switched in the particularly low-loss ZVS. If the converter is operated in discontinuous operation, the secondary-side transformer current has a distinct phase in which this current is zero. This is therefore intermittent operation on the secondary side of the converter. At this operating point, the first, second and fourth switching element S1, S2 and S4 are switched with ZVS. The third switching element S3 switches on with ZCS against a reduced voltage. This operating point also has low switching losses and thus likewise allows a high switching frequency.

In order to be able to transfer a constant power to the battery at any time, the duty cycles of the first and of the second switching element S1, S2 must not fall below or exceed certain minimum and maximum limits. This means that the converter can take current from the grid only up to a minimum input voltage. Therefore, the current drawn from the energy source, in the region of the zero crossing of the voltage from the energy source, has regions in which this current is zero and the third and the fourth diode of the diode half-bridge turn off at the same time.

A method is advantageously provided by way of which the switching elements of the charging device are controlled in such a way that energy is transferred through the charging device from a connected energy source to a connected battery.

The invention further relates to a computer program which is configured to perform the described method.

The invention further relates to a machine-readable storage medium on which the described computer program is stored.

It is understood that the features, properties and advantages of the charging device correspondingly apply or are applicable to the method or the drive train and the vehicle and vice versa.

BRIEF DESCRIPTION OF THE DRAWINGS

Further features and advantages of embodiments of the invention arise from the following description with reference to the appended drawings.

The invention will be explained in more detail below on the basis of several figures, in which.

DETAILED DESCRIPTION

Figure 1:
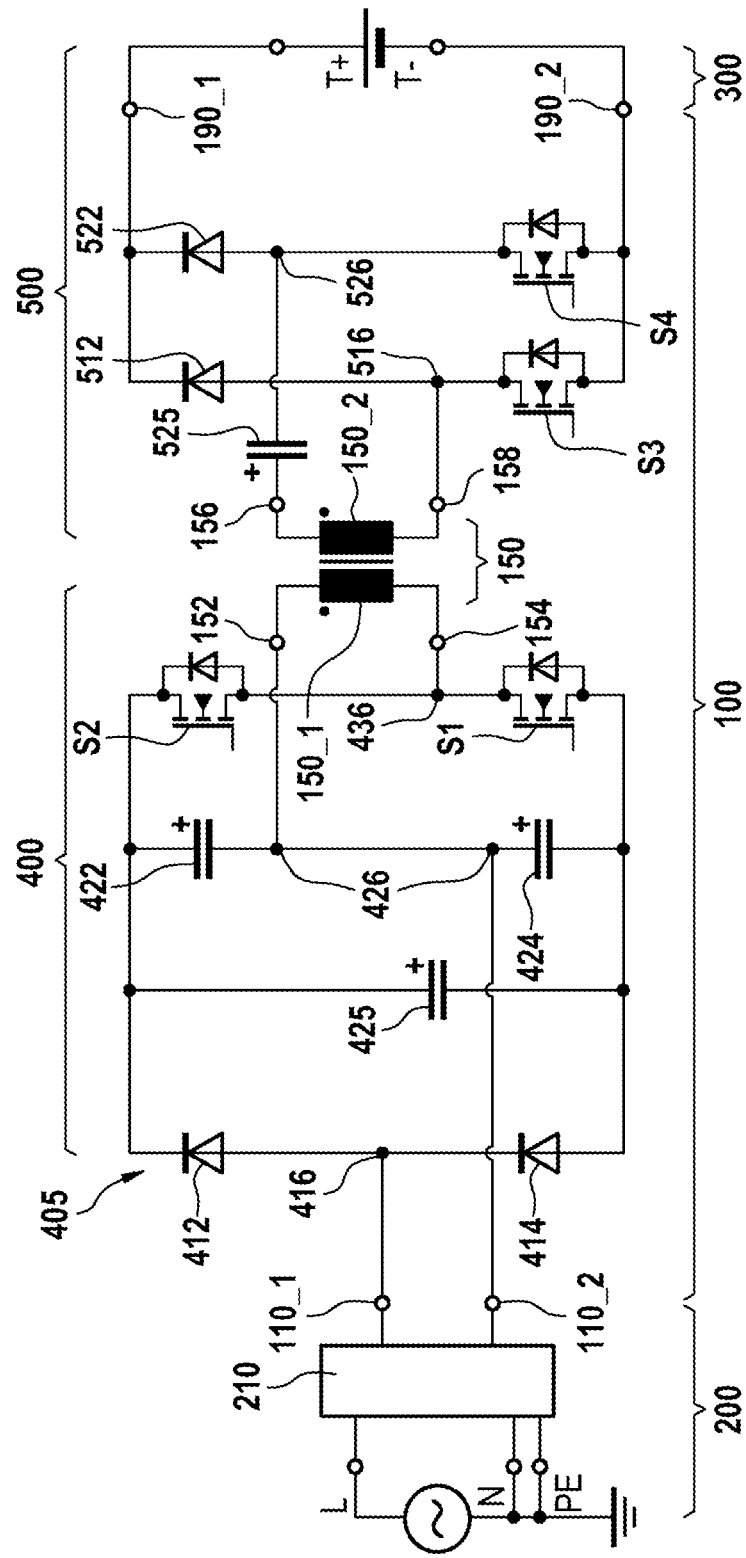
FIG. 1 shows a schematic illustration of a first embodiment of a circuit topology for a charging device.

FIG. 1 shows a charging device 100 which, in operation, is electrically connected at an input-side first terminal 110_1, 110_2 to an energy source 200 and at an output-side second terminal 190_1, 190_2 to a battery 300 to be charged. The energy source 200, the energy of which is intended to be used to charge the battery, is preferably a single-phase AC source, for example the public power supply grid. The charging device comprises a primary circuit 400, on its input side, and an output-side secondary circuit 500. The primary and secondary circuit are connected to one another, preferably inductively, via the primary winding 150_1 of a transformer 150 and the secondary coil 150_2 thereof, but are galvanically isolated. The primary circuit comprises a rectification circuit 405 and a parallel connection of two branches each having a high-side element, preferably an electrical component which is arranged on the high side of a half-bridge, and a low-side element, preferably an electrical component which is arranged on the low side of the half-bridge. A first branch comprises a first and a second series-connected capacitor 422, 424 and a first center tap 426 between the capacitors. The first center tap 426 is connected to a first connection pole 152 of the primary winding 150_1 of the transformer. A second branch comprises a series-connected first low-side switching element S1 and a second series-connected high-side switching element S2 having a second center tap 436 between the switching elements S1, S2. The second center tap 436 is connected to a second connection pole 154 of the primary winding 150_1. The intrinsic diodes of the first and of the second switching element S1, S2 are aligned such that a flow from the low side to the high side of the second branch is made possible. The secondary circuit 500 comprises a parallel connection of two branches each having a high-side element and a low-side element. One of these branches, the third branch, comprises a series connection of a first high-side diode 512 and of a third low-side switching element S3 having a third center tap 516 between the first diode and the third switching element. The third center tap 516 is connected to a second connection pole 158 of the secondary winding 150_2 of the transformer 150. The first diode 512 and the intrinsic diode of the third switching element S3 are aligned such that a flow from the low side to the high side of the third branch is made possible. A further branch of the secondary circuit, the fourth branch, comprises a series connection of a second high-side diode 522 and of a fourth low-side switching element S4 having a fourth center tap 526 between the second diode 522 and the fourth switching element S4. The fourth center tap 526 is connected to a first connection pole 156 of the secondary winding 150_2 of the transformer 150. The second diode 522 and the intrinsic diode of the fourth switching element S4 are aligned such that a flow from the low side to the high side of the fourth branch is made possible. A first connection pole 190_1 of the second terminal 190 is connected to the cathodes of the first and second diode 512, 522 and a second connection pole 190_2 of the second terminal 190 is connected to the third and fourth switching elements S3, S4 at the ends of the third and fourth branch. The rectification circuit 405 according to FIG. 1 comprises a series-connected third high-side diode 412 and a fourth low-side diode 414 having a fifth center tap 416 between the third and fourth diode 412, 414. The fifth center tap is connected to a first connection pole 110_1 of the first terminal. The series-connected third high-side diode 412 and fourth low-side diode 414 are connected in parallel with the first and second capacitor 422, 424. The third and the fourth diode are aligned such that a flow from the low side to the high side is made possible. The first center tap 426 between the capacitors is connected to a second connection pole 110_2 of the first terminal. Preferably, a further, fifth branch is connected in parallel with the primary circuit 400, which branch comprises a third capacitor 425. Further, a fourth capacitor 525 is preferably connected between the fourth center tap 526 and the first connection pole 156 of the secondary winding of the transformer 150.

Figure 2:
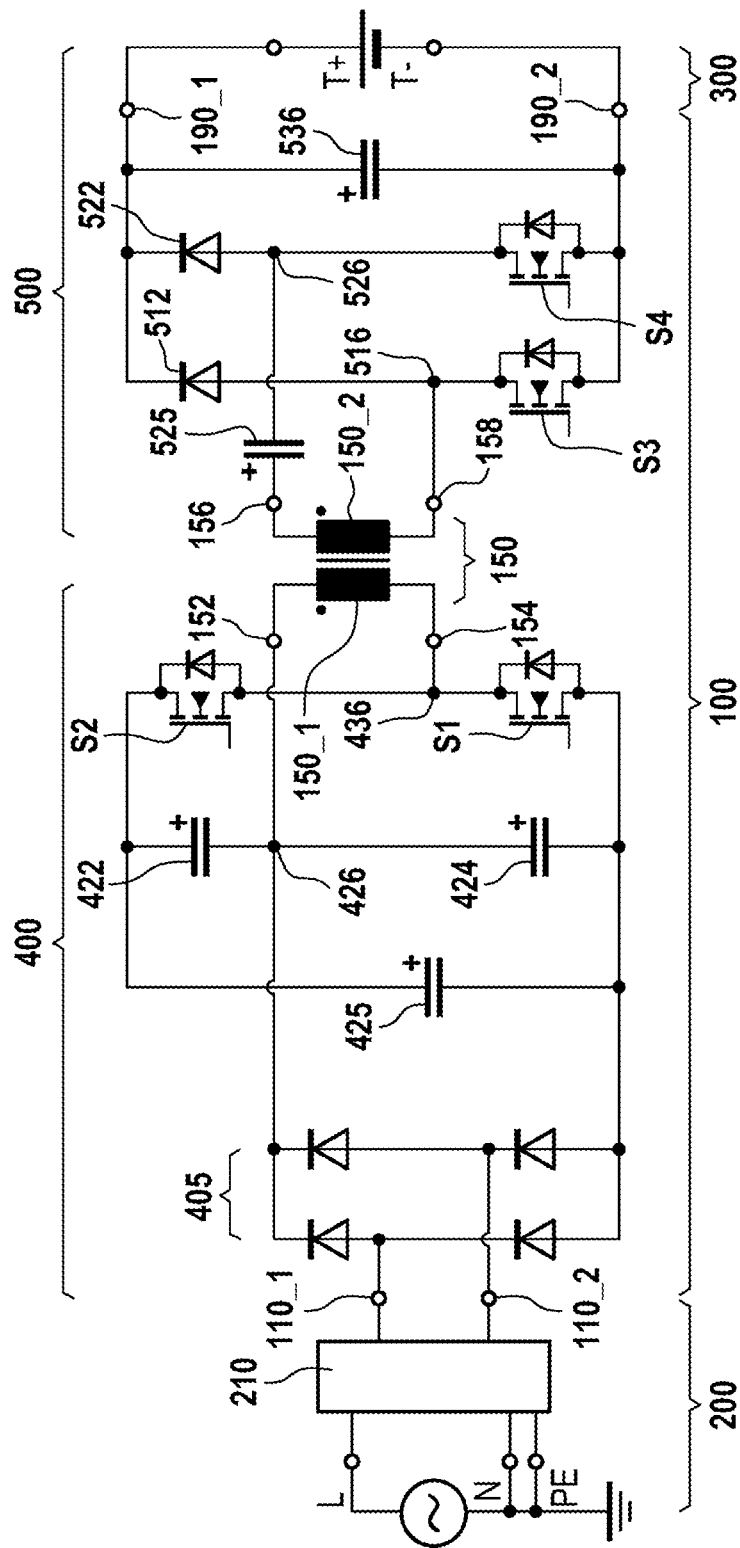
FIG. 2 shows a schematic illustration of a second embodiment of a circuit topology for a charging device.

FIG. 2 shows a schematic illustration of a second embodiment of a circuit topology for a charging device. The circuit topology and the reference signs largely correspond to the circuit topology shown in FIG. 1. Only the differences from the circuit topology shown in FIG. 1 will be discussed below. The rectifier circuit 405 comprises a bridge rectifier having four diodes. This bridge rectifier is connected, on its input side, to a first connection pole 110_1 and to a second connection pole 110_2 of the first terminal, and, on its output side, is connected in parallel with the second capacitor 424. Preferably, a further, sixth branch is connected in parallel with the secondary circuit 500, which branch comprises a fifth capacitor 536. In particular, in contrast to the topology according to FIG. 1, for both grid half-cycles, there is a galvanic connection only to the second capacitor 424.

Figure 3:
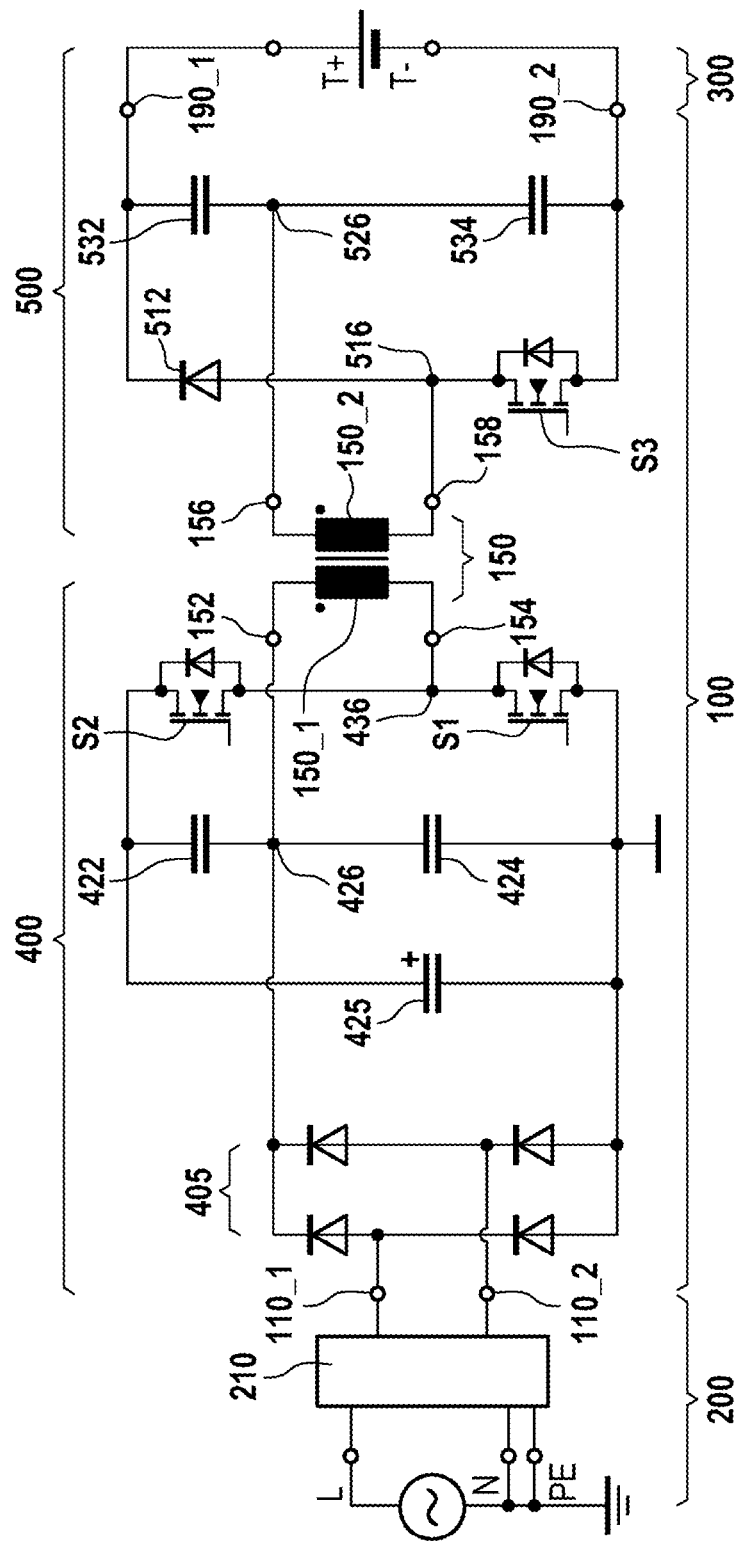
FIG. 3 shows a schematic illustration of a third embodiment of a circuit topology for a charging device.

FIG. 3 shows a schematic illustration of a third embodiment of a circuit topology for a charging device. The circuit topology and the reference signs largely correspond to the circuit topology shown in FIG. 2. Only the differences from the circuit topology shown in FIG. 2 will be discussed below. The secondary circuit 500 of the charging device 100 comprises a parallel connection of two branches each having a high-side element and a low-side element. One of these branches, the third branch, comprises a series connection of a first high-side diode 512 and of a third low-side switching element S3 having a third center tap 516 between the first diode and the third switching element. The third center tap 516 is connected to a second connection pole 158 of the secondary winding 150_2 of the transformer 150. The first diode 512 and the intrinsic diode of the third switching element S3 are aligned such that a flow from the low side to the high side of the third branch is made possible. A further branch of the secondary circuit, the fourth branch, comprises a series connection of a sixth capacitor 532 and of a seventh capacitor 534 having a fourth center tap 526 between the sixth and the seventh capacitor 532, 534. The fourth center tap 526 is connected to a first connection pole 156 of the secondary winding 150_2 of the transformer 150. A first connection pole 190_1 of the second terminal 190 is connected to the cathode of the first diode 512 and a second connection pole 190_2 of the second terminal 190 is connected to the third switching element S3 at the end of the third and fourth branch.

Figure 4:
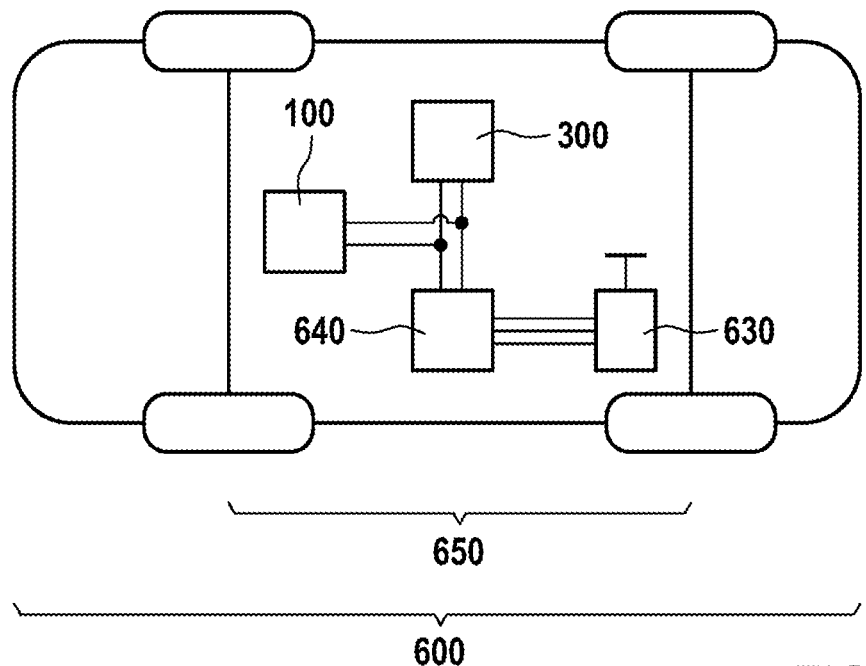
FIG. 4 shows a schematically illustrated vehicle having a drive train having a charging device.

FIG. 4 shows a schematically illustrated vehicle 600 having a drive train 650 having a charging device 100. The vehicle 600 is illustrated with four wheels here only by way of example, but the invention can equally be used in any vehicles with any number of wheels on land, on water and in the air. The drive train 650 illustrated by way of example comprises at least one charging device 100. Further, the drive train preferably comprises a battery 300, an inverter 640 and an electrical machine 630.

Figure 5:
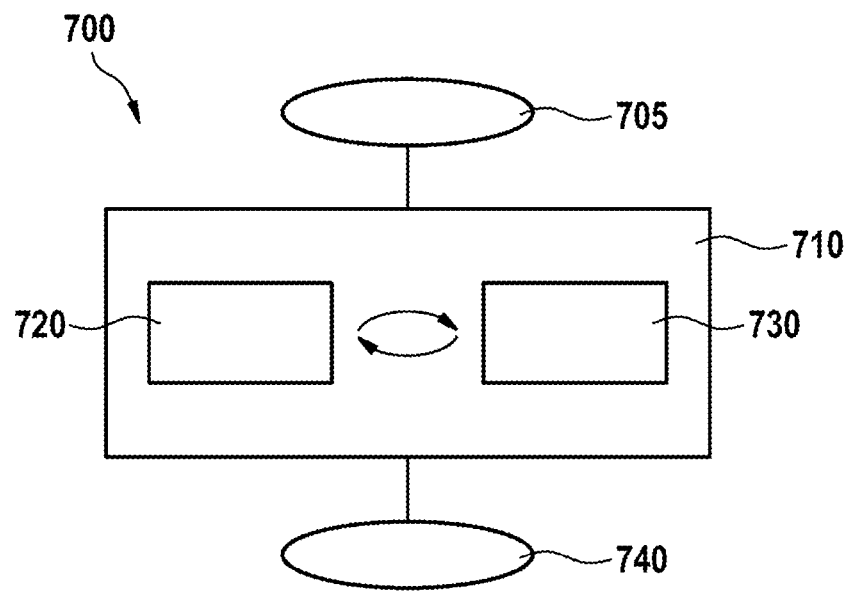
FIG. 5 shows a schematically illustrated flow diagram for a method for operating a charging device.

FIG. 5 shows a schematically illustrated flow diagram for a method 700 for operating a charging device 100. The method 700 starts with the step 705. In step 710, the second and the first switching element are alternately switched on and off. When the first switching element is switched on (720), the fourth switching element is switched on and switched off at least once. When the second switching element is switched on (730), the third switching element is switched on and switched off at least once. The method ends with step 740.

The invention claimed is:
1. A charging device (100) having:
   an input-side first terminal (110_1, 110_2) for connection to an electrical energy source (200),
   an output-side second terminal (190_1, 190_2) for connection to a battery (300) to be charged,
   a transformer (150), the primary winding (150_1) of which is electrically connected to the first terminal (110_1, 110_2) by means of a primary circuit (400) and the secondary winding (150_2) of which is electrically connected to the second terminal (190_1, 190_2) by means of a secondary circuit (500),
   wherein the primary circuit (400) comprises a rectification circuit (405) and a parallel connection of two branches each having a high-side element and a low-side element, having:
   a first branch which comprises a first and a second series-connected capacitor (422, 424) having a first center tap (426) between the capacitors, which first center tap is connected to a first connection pole (152) of the primary winding (150_1),
   a second branch which comprises a series-connected first low-side switching element (S1) and a second series-connected high-side switching element (S2) having a second center tap (436) between the switching elements, which second center tap is connected to a second connection pole (154) of the primary winding (150_1),
   wherein the intrinsic diodes of the first and of the second switching element (S1, S2) are aligned such that a flow from the low side to the high side is made possible,
   wherein the secondary circuit (500) comprises a parallel connection of two branches each having a high-side element and a low-side element, having:
   a third branch which comprises a series connection of a first high-side diode (512) and of a third low-side switching element (S3) having a third center tap (516) between the first diode and the third switching element, which third center tap is connected to a second connection pole (158) of the secondary winding (150_2),
   wherein the first diode (512) and the intrinsic diode of the third switching element (S3) are aligned such that a flow from the low side to the high side is made possible,
   a fourth branch which comprises a series connection of a second high-side diode (522) and of a fourth low-side switching element (S4) having a fourth center tap (526) between the second diode (522) and the fourth switching element (S4), which fourth center tap is connected to a first connection pole (156) of the secondary winding (150_2), wherein the second diode (522) and the intrinsic diode of the fourth switching element (S4) are aligned such that a flow from the low side to the high side is made possible, wherein a first connection pole (190_1) of the second terminal (190_1, 190_2) is connected to the cathodes of the first and second diode (512, 522) and a second connection pole (190_2) of the second terminal (190_1, 190_2) is connected to the third and fourth switching elements (S3, S4) at the ends of the third and fourth branch.

2. The charging device (100) as claimed in claim 1, wherein the rectification circuit (405) comprises a series-connected third high-side diode (412) and a fourth low-side diode (414) having a fifth center tap (416) between the diodes (412, 414), which fifth center tap is connected to a first connection pole (110_1) of the first terminal, wherein the series-connected third high-side diode (412) and fourth low-side diode (414) are connected in parallel with the first and second capacitor (422, 424) and wherein the third and the fourth diode are aligned such that a flow from the low side to the high side is made possible, and wherein the first center tap (426) between the capacitors is connected to a second connection pole (110_2) of the first terminal.

3. The charging device (100) as claimed in claim 1, wherein the rectification circuit (405) comprises a bridge rectifier having four diodes, which bridge rectifier is connected, on its input side, to a first connection pole (110_1) and to a second connection pole (110_2) of the first terminal, and, on its output side, is connected in parallel with the second capacitor (424).

4. The charging device (100) as claimed in claim 1, wherein a further, fifth branch is connected in parallel with the primary circuit (400), which branch comprises a third capacitor (425).

5. The charging device (100) as claimed in claim 1, wherein a fourth capacitor (525) is connected between the fourth center tap (526) and the first connection pole (156) of the secondary winding.

6. A drive train (650) of a vehicle (600) having an inverter (640) and an electrical machine (630), wherein the drive train comprises at least one charging device (100) as claimed in claim 1.

7. A vehicle (600) having a drive train (650) as claimed in claim 6.

8. A method (700) for operating a charging device (100) having
- an input-side first terminal (110_1, 110_2) for connection to an electrical energy source (200)
- an output-side second terminal (190_1, 190_2) for connection to a battery (300) to be charged,
- a transformer (150), the primary winding (150_1) of which is electrically connected to the first terminal (110_1, 110_2) by means of a primary circuit (400) and the secondary winding (150_2) of which is electrically connected to the second terminal (190_1, 190_2) by means of a secondary circuit (500),
- wherein the primary circuit (400) comprises a rectification circuit (405) and a parallel connection of two branches each having a high-side element and a low-side element, having:
- a first branch which comprises a first and a second series-connected capacitor (422, 424) having a first center tap (426) between the capacitors, which first center tap is connected to a first connection pole (152) of the primary winding (150_1),
- a second branch which comprises a series-connected first low-side switching element (S1) and a second series-connected high-side switching element (S2) having a second center tap (436) between the switching elements, which second center tap is connected to a second connection pole (154) of the primary winding (150_1),
- wherein the intrinsic diodes of the first and of the second switching element (S1, S2) are aligned such that a flow from the low side to the high side is made possible,
- wherein the secondary circuit (500) comprises a parallel connection of two branches each having a high-side element and a low-side element, having:
- a third branch which comprises a series connection of a first high-side diode (512) and of a third low-side switching element (S3) having a third center tap (516) between the first diode and the third switching element, which third center tap is connected to a second connection pole (158) of the secondary winding (150_2),
- wherein the first diode (512) and the intrinsic diode of the third switching element (S3) are aligned such that a flow from the low side to the high side is made possible,
- a fourth branch which comprises a series connection of a second high-side diode (522) and of a fourth low-side switching element (S4) having a fourth center tap (526) between the second diode (522) and the fourth switching element (S4), which fourth center tap is connected to a first connection pole (156) of the secondary winding (150_2),
- wherein the second diode (522) and the intrinsic diode of the fourth switching element (S4) are aligned such that a flow from the low side to the high side is made possible,
- wherein a first connection pole (190_1) of the second terminal (190_1, 190_2) is connected to the cathodes of the first and second diode (512, 522) and a second connection pole (190_2) of the second terminal (190_1, 190_2) is connected to the third and fourth switching elements (S3, S4) at the ends of the third and fourth branch, the method comprising the following steps:
- alternately switching the second and the first switching element (S2, S1) on and off (710),
- wherein, when the first switching element (S1) is switched on (720), the fourth switching element (S4) is switched on and switched off at least once and
- wherein, when the second switching element (S2) is switched on (730), the third switching element (S3) is switched on and switched off at least once.

9. A non-transitory, computer-readable storage medium containing instructions that when executed by a computer cause the computer to control a charging device (100) having
- an input-side first terminal (110_1, 110_2) for connection to an electrical energy source (200),
- an output-side second terminal (190_1, 190_2) for connection to a battery (300) to be charged,
- a transformer (150), the primary winding (150_1) of which is electrically connected to the first terminal (110_1, 110_2) by means of a primary circuit (400) and the secondary winding (150_2) of which is electrically connected to the second terminal (190_1, 190_2) by means of a secondary circuit (500), wherein the primary circuit (400) comprises a rectification circuit (405) and a parallel connection of two branches each having a high-side element and a low-side element, having:

a first branch which comprises a first and a second series-connected capacitor (422, 424) having a first center tap (426) between the capacitors, which first center tap is connected to a first connection pole (152) of the primary winding (150_1), a second branch which comprises a series-connected first low-side switching element (S1) and a second series-connected high-side switching element (S2) having a second center tap (436) between the switching elements, which second center tap is connected to a second connection pole (154) of the primary winding (150_1), wherein the intrinsic diodes of the first and of the second switching element (S1, S2) are aligned such that a flow from the low side to the high side is made possible, wherein the secondary circuit (500) comprises a parallel connection of two branches each having a high-side element and a low-side element, having:

a third branch which comprises a series connection of a first high-side diode (512) and of a third low-side switching element (S3) having a third center tap (516) between the first diode and the third switching element, which third center tap is connected to a second connection pole (158) of the secondary winding (150_2), wherein the first diode (512) and the intrinsic diode of the third switching element (S3) are aligned such that a flow from the low side to the high side is made possible, a fourth branch which comprises a series connection of a second high-side diode (522) and of a fourth low-side switching element (S4) having a fourth center tap (526) between the second diode (522) and the fourth switching element (S4), which fourth center tap is connected to a first connection pole (156) of the secondary winding (150_2), wherein the second diode (522) and the intrinsic diode of the fourth switching element (S4) are aligned such that a flow from the low side to the high side is made possible, wherein a first connection pole (190_1) of the second terminal (190_1, 190_2) is connected to the cathodes of the first and second diode (512, 522) and a second connection pole (190_2) of the second terminal (190_1, 190_2) is connected to the third and fourth switching elements (S3, S4) at the ends of the third and fourth branch, by:

alternately switching the second and the first switching element (S2, S1) on and off (710), wherein, when the first switching element (S1) is switched on (720), the fourth switching element (S4) is switched on and switched off at least once and wherein, when the second switching element (S2) is switched on (730), the third switching element (S3) is switched on and switched off at least once.

* * * * *